United States Patent [19]
Katsurayama
[11] 3,887,943
[45] June 3, 1975

[54] AUTOMATIC STOP APPARATUS FOR TAPE RECORDER

[75] Inventor: Hiromasa Katsurayama, Nagoya, Japan

[73] Assignee: Shin-Shirasuna Electric Corporation, Nagoya-shi, Japan

[22] Filed: Mar. 22, 1973

[21] Appl. No.: 343,662

[52] U.S. Cl. .................... 360/96; 242/189; 360/74; 360/105
[51] Int. Cl....G11b 23/04; G11b 15/43; G11b 15/00
[58] Field of Search ........ 360/96, 105, 74; 242/189, 242/190, 191

[56] References Cited
UNITED STATES PATENTS

| | | | |
|---|---|---|---|
| 3,609,844 | 10/1971 | Ichikawa | 360/96 |
| 3,660,810 | 5/1972 | Yoshii | 360/96 |
| 3,779,482 | 12/1973 | Chimura | 360/96 |

*Primary Examiner*—Alfred H. Eddleman
*Attorney, Agent, or Firm*—Kurt Kelman

[57] ABSTRACT

In a tape passing a predetermined path of a tape recorder, tension of the tape suddenly increases at the fixed terminal end of the tape. A lever and a link mechanism are operated by the increased tape tension to unlock a mechanism held in "play" mode and to shut off the power thereby stopping the operation of the tape recorder automatically.

6 Claims, 12 Drawing Figures

AUTOMATIC STOP APPARATUS FOR TAPE RECORDER

BACKGROUND OF THE INVENTION

The present invention relates to an automatic stop apparatus of a tape recorder and, more particularly, to an apparatus for automatically stopping the tape recorder of, for example, cassette tape, in which the terminal end of the tape is secured to a reel, by mechanically disengaging a mechanism set in the "play" mode and turning off the power.

Heretofore, two types of automatic stop apparatus have been in practical use, namely, an electrical stop apparatus, in which metal foil attached to the terminal end of the tape is detected by a detector, the detected signal is amplified to operate a solenoid disengaging a lock mechanism, and a mechanical stop apparatus for mechanically disengaging the lock mechanism by using the sudden increase of tape tension at the terminal end of the tape. The electrical automatic stop apparatus has the disadvantages such that the manufacturing cost is high since it uses relatively expensive parts and that the construction is complicated and inevitably large-sized. In the mechanical automatic stop apparatus, in which a stopper is engaged with the groove of a sliding plate related to a play button, the spring bias operating the sliding plate and the stopper and the disengaging force opposing the friction force are obtained from the tape tension. Since a relatively large force (35 – 110 g) is required for disengaging, the mere increase (about 50 – 70 g) in the tension at the terminal end of the tape is frequently insufficient to provide such a large disengaging force. Thus, the mechanical automatic stop apparatus has the disadvantages such that the operation is not stable, and that it is not suitable for mass production since it requires a complicated adjustment taking a long time after assembly.

Accordingly, the object of this invention is to provide a simple mechanical automatic stop apparatus for stopping a mechanism in operating condition using an energy obtained when the tape tension increases.

Another object of this invention is to provide a new lock apparatus for attaining the above object.

SUMMARY OF THE INVENTION

Briefly, the automatic stop apparatus according to the present invention, suitable for use with a tape recorder particularly of the type using a cassette, utilizes the energy of the tape tension suddenly increased when the tape in recording or reproducing mode is completely wound up in a take-up reel to stop all the mechanism in operation. Therefore, the apparatus according to the present invention uses lock means of a new mechanism for maintaining the tape recording in operation and is constructed so as to make the best use of the characteristic of the force provided by the tape tension.

The lock means according to this invention has a set of pivotally connected arms having a sensing lever at an end each thereof. The sensing lever is engaged with the tape. During the play mode of the tape recorder, the set of the arms are aligned substantially in a straight line and locked. When the tension of the tape at the end thereof secured to the reel increases, the sensing lever is operated to fold the set of aligned arms at the joint thereby releasing the arms from the locked condition.

BRIEF DESCRIPTION OF THE DRAWINGS

The invention will be better understood from the following description taken in connection with the accompanying drawings in which.

DESCRIPTION OF THE PREFERRED EMBODIMENTS

Figure 1:
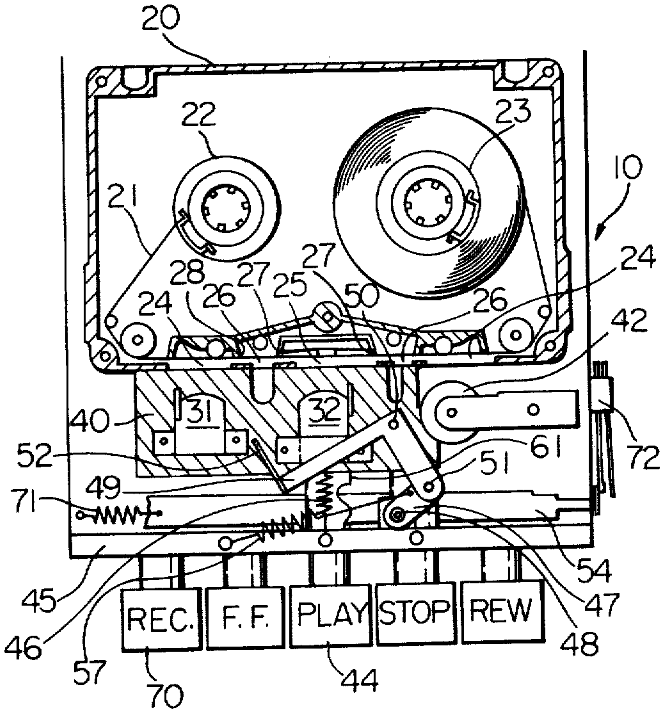
FIG. 1 is a schematic plan view of a cassette tape recorder with the automatic stop apparatus using the lock means according to the present invention.
Figure 2:
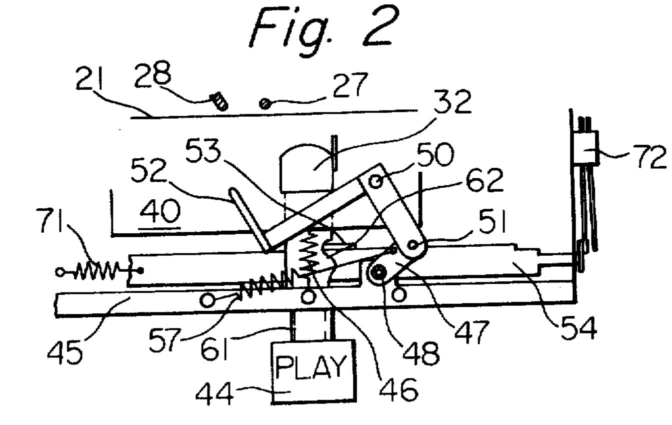
FIG. 2 is a plan view of the lock means of FIG. 1 in a non-operable condition.

FIG. 1 shows an embodiment of a cassette tape recorder with the automatic stop apparatus using the novel lock means according to the present invention. In FIG. 1 there is shown a common cassette tape recorder 10 loaded with a cassette 20 in standing by for operation. The cassette 20 can be a common one on the market symmetrically constructed so as to record and reproduce the sound both way simply by reversing the front and back sides, and both ends of the magnetic tape 21 are secured respectively to a set of reels 22 and 23. A window 24 is provided on the front side of the cassette for inserting an erasing head 31 and a pinch roller 42 therethrough. A window 25 is for inserting a recording-reproducing head 32 therethrough. A window 26 which is normally not used is used in this invention for detecting the tension of the tape. Reference numerals 27 and 28 denote respectively a pin and a projection provided in the cassette (see FIG. 2). The front edges of them are substantially in parallel to the tape running system of the cassette and are equally spaced from the center of the window 26.

The recording head 32 and erasing head 31 are fixed to a sub-chassis 40 which is slidable only in the direction perpendicular to the front side of the cassette 20. When the sub-chassis 40 is slidingly moved in the forward direction (to the top in Figures), the heads 31, 32 and the pinch roller 42 are inserted through the respective windows 24 and 25 provided in the front side of the cassette 20 (see FIG. 3). At the same time, a take-up reel 23 and the pinch roller 42 begin to rotate and to transport the tape 21. The sub-chassis 40 is interlinked with a play button 44 which is provided with a spring 46 an end thereof is fixed to a chassis 45 for always storing a force sufficient to pull the play button 44 and the subchassis 40 back (to the bottom in Figures) to the stop position. An arm 47 is pivotally mounted at an end to a supporting point 48 on the chassis 45. An arm 49 is pivotally mounted to a supporting point 50 on the subchassis 40. The two arms 47 and 49 are pivotally interconnected at a connecting point 51.

A slider 54 is related to each push button, for example the play button 44. At an end of the slider is attached a spring 71 and at the other end thereof is engaged a movable contact of a normally open switch 72 connected to a source of power (not shown).

Figure 3:
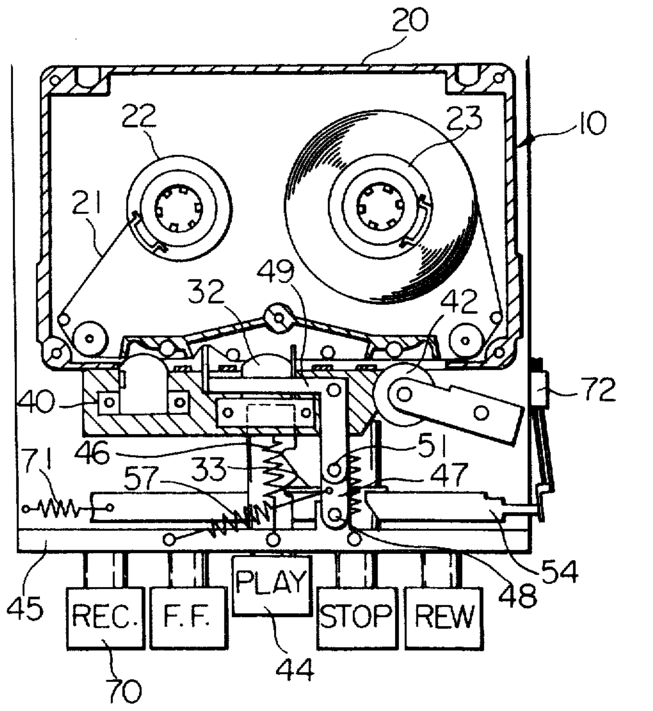
FIG. 3 is a schematic plan view of the cassette tape recorder similar to FIG. 1 in a play mode.

At the other end of the arm 49 is attached a sensing lever 52 which is inserted through the window 26 of the cassette and urged against the tape 21 to detect the tape tension (see FIG. 3). A stopper 53 bent in right angle from the plane of the slider 54 and extending and a groove 62 (best shown in FIG. 4) formed in a plate 61 fixed to the play button 44 control the inclination of the arms 47 and 49 and determine the lock position. In a normal stop operation, when a stop button 56 is pushed, the slider 54 and the stopper 53 slide laterally to the right in FIG. 4 to pivotally move the arms 47 and 49 thereby locking and simultaneously opening a switch 72 to turn off the power. A spring 57 has an end attached to the arm 47 and the other end to the chassis 45 to provide a power sufficient to make the arms 47 and 49 abut with the stopper 53 and to move the sensing lever 52 forward. The spring 57 also serves to prevent the arm 49 from being displaced in a normal tape running operation to cause a mis-operation.

The plate 61 is provided with a cam surface 62*a* (best shown in FIG. 4) connected with the groove 62. When the plate 61 is returned (from the position shown in FIG. 4 to the position shown in FIG. 3) the cam surface 62*a* moves the stopper 53 and, accordingly, the slider 54 to the right in FIG. 4 to simultaneously unlock the record button 70 (see FIG. 1).

Figure 4:
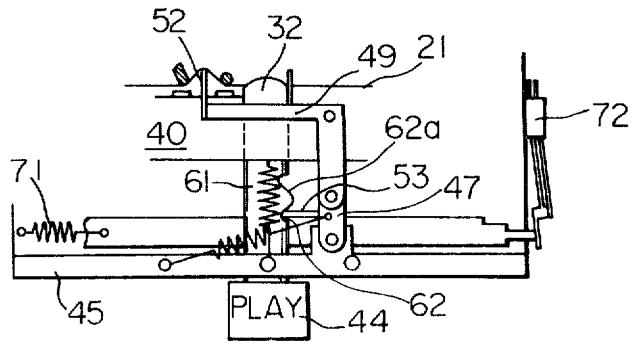
FIG. 4 is a plan view of the lock means of FIG. 3 in a play mode.

As shown in FIGS. 3 and 4, when an operator pushes the play button 44, the tape recorder is set at reproduce mode. At this time, the sub-chassis 40 slides forward to insert the heads 31, 32 and the pinch roller 42 into the respective windows 24 and 25 provided in the cassette 20 to make them engage with the magnetic tape 21 and to make the arms 47 and 49 in a straight line to insert the sensing lever 52 attached to the arm 49 into the window 26 of the cassette 20. At the same time the other end of the slider 54 closes the switch 72 to turn the power on.

Figure 5:
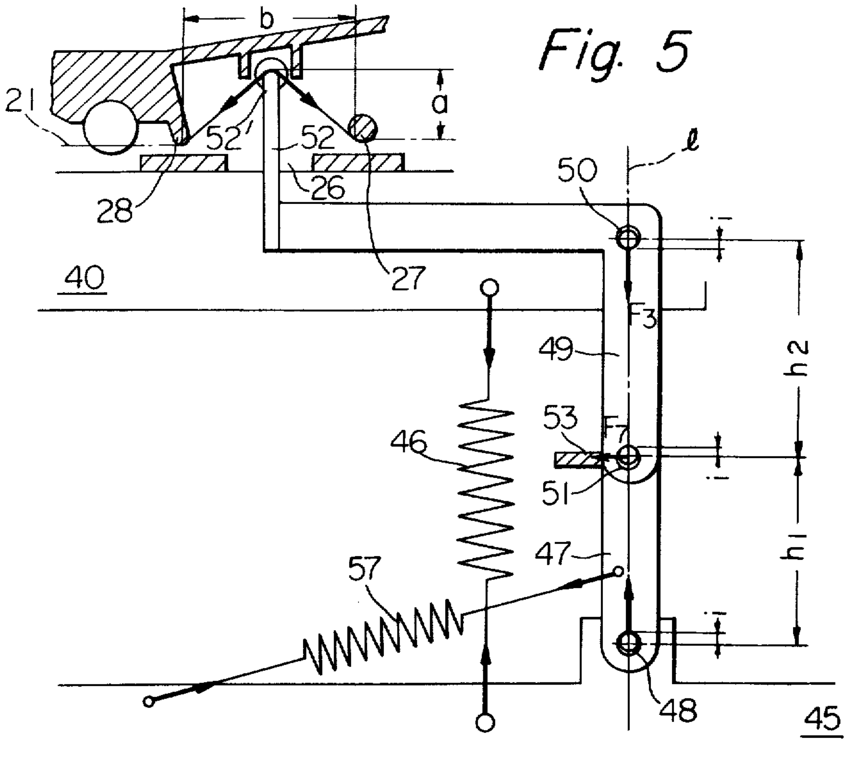
FIG. 5 is an enlarged view of the lock means of FIG. 4 showing transmission of forces among various elements in play mode.

As shown enlarged in FIG. 5, when the sensing lever 52 is inserted from the center of the window 26 of the cassette 20 in the direction perpendicular to the front face of the cassette, the tape 21 is pressed against the front edges of the projection 27 and the pin 28, and the tape at the center of these two points is pressed deeper than the tip of the sensing lever 52.

At this time, the stopper 53 provided at the slider 54 engages with the side face of the arm 47 as well as with the groove 62 of the plate 61 to serve to maintain the sub-chassis 40 at the operating position.

Figure 6:
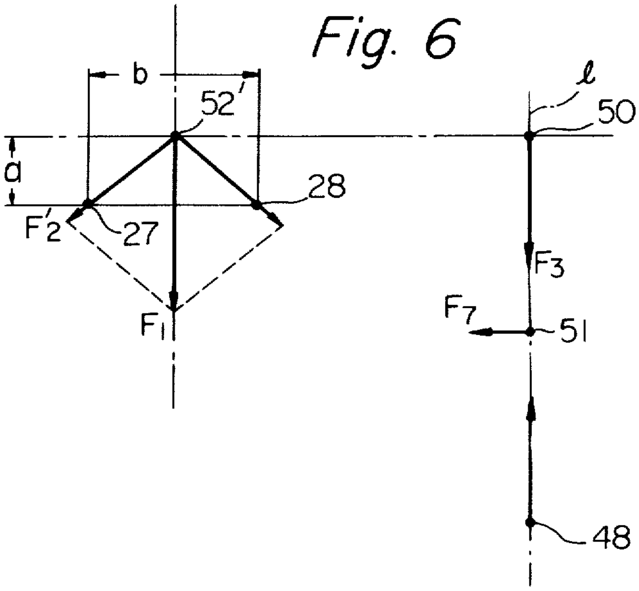
FIG. 6 illustrates transmission of forces in the lock means by vectors.
Figure 7:
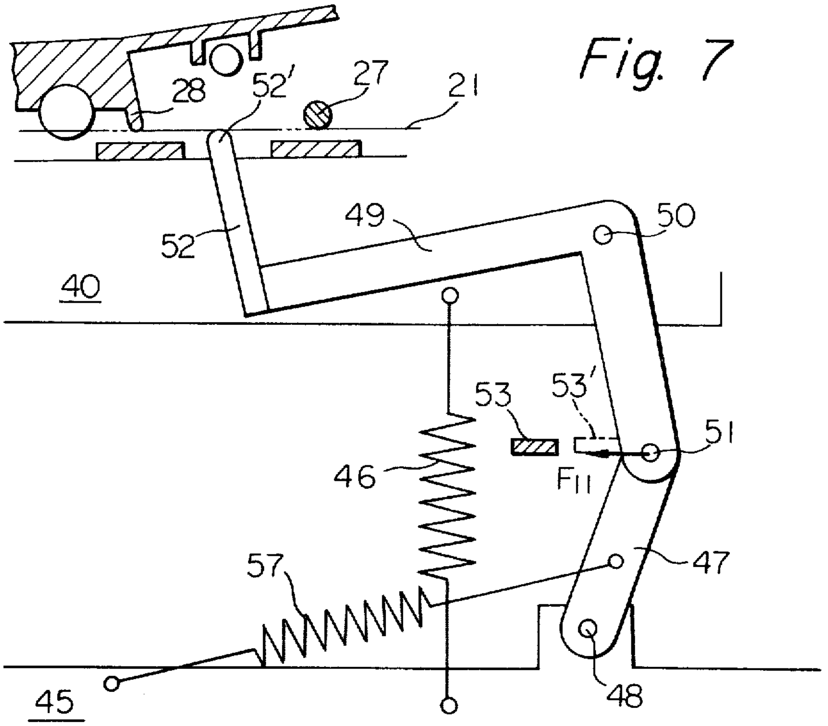
FIG. 7 is an enlarged view of the lock means similar to FIG. 5 showing transmission of forces at the terminal end of the tape secured to a reel.

When the tape remains at the supply reel side, the tape tension is small and slightly varies with the amount of the tape remaining at the supply reel side. However, when the tape is fed out from the supply reel side, since the end of the tape is secured to the reel, the tape tension $F_2$ increases as shown in FIG. 6 to produce a force $F_1$ to force out the sensing lever 52 inserted through the window 26 of the cassette. The sensing lever 52 receives the force $F_1$ from the tape 21 and overcomes the lock holding force to pivotally move the arm 49 which is integral with the sensing lever 52 and to move the sub-chassis 40 backward as shown in FIGS. 1 and 7 to thereby mechanically stop the tape recorder.

The supporting point 50 of the arm 49 is attached to the sub-chassis so as to be slidable in one unit. Accordingly, the advance positions of the heads 31 and 32 attached to the sub-chassis are controlled by the sum of the lengths of the arms 47 and 49 thereby preventing the heads from going into the cassette deeper than desirable and urging the tape against the innermost wall of the cassette to damage the tape. And since the inclination of the arms 47 and 49 is small at the locked position, even when there is a certain error in the position of the stopper 53, the error of the head in the advance position can be made small.

Relationship between forces at the moment when the tape winding is completed in the record or reproduce mode of the tape recorder as shown in FIG. 5 will now be explained by vectors in FIG. 6. The length of the portion of the sensing lever 52 advancing beyond the line connecting between the projection 28 and the pin 27 is denoted *a*, the length between the projection 28 and the pin 27 is denoted *b*, and the tape tension is denoted $F_2$. Then the force $F_2$ is produced in the direction in which the tape is pulled, namely from the tip 52' of the sensing lever 52 to the pin 28, and the reaction force $F_2'$ thereby is produced from the tip 52' to the projection 27. Since the magnitude of the force $F_2$ is equal to that of the reaction force $F_2'$, $F_2 = F_2'$. Then the force $F_1$ can be obtained as the sum of these two forces. This can be expressed by the following equation 1:

$$F_1 = 2 \cdot F_2 \cdot a / \sqrt{a^2 + b^2/4} \quad (1)$$

Figures 9, 10:
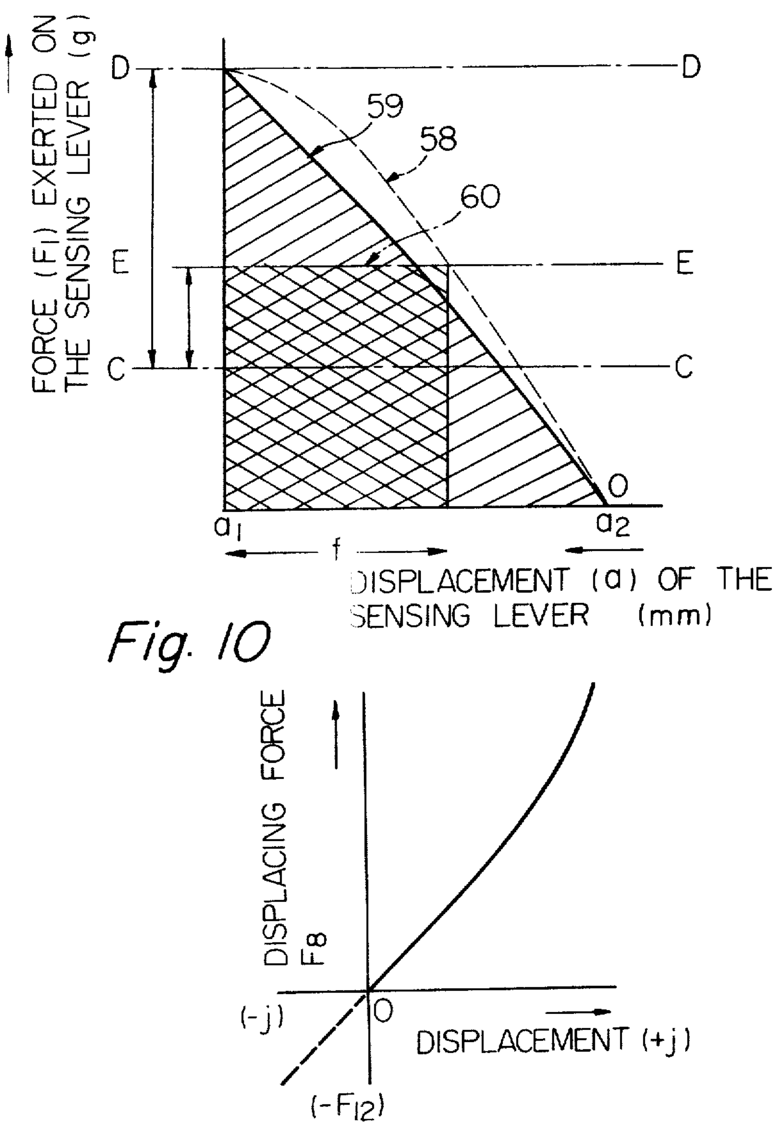
FIG. 9 is a graph explaining the characteristics of the apparatus according to the present invention in contrast to those of the prior apparatus.
FIG. 10 is a graph showing the relation between the displacing force and the length of displacement of the lock means.
Figure 11:
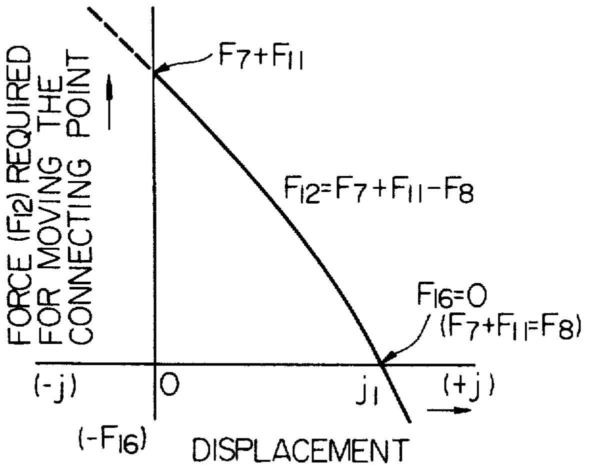
FIG. 11 is a graph showing the relation between the force required to disengage the lock means and the length of the displacement; and, FIG. 12 is a graph similar to FIG. 11 showing the characteristic of the lock means provided with an initial displacement.

FIG. 9 shows the characteristics of the sensing lever of the apparatus according to the present invention actually applied in the cassette. In FIG. 9, the axis of ordinate indicates the force $F_1$ exerted on the sensing lever 52, and the axis of abscissa indicates the length of displacement *a* of the tip 52' of the sensing lever 52. The dotted curve 58 indicates the characteristic of the force exerted on the sensing lever by the tape tension. The solid line 59 indicates the characteristic of the force exerted on the lock means according to the present invention by the sensing lever and the horizontal straight line 60 indicates the characteristic shown when the known lock means in which the engaging means is slidable is used. As the tip 52' of the sensing lever 52 is pushed out of the tape, the magnitude of the force obtained from the tape tension diminishes. The tape tension $F_2$ at the end of the tape is determined by the pinch roller transporting the tape and the capstan. However, at the state mentioned above, since the capstan is idling, it varies with the degree of contamination on the surface of the tape and the urging tension of the pinch roller.

The line D indicates the force exerted on the sensing lever at the moment when the running tape reaches the end in the characteristic of the dotted curve 58, and the line C indicates the force normally exerted on the sensing lever in the normal tape running condition. As described above, the sensing lever 52 detects the terminal end of the tape 21 and the range of the force available is between the lines C and D in FIG. 9.

When the tip 52' of the sensing lever 52 is moved by the tape tension from the length $a_1$ entering into the tape to the length $a_2$, the work $W_1$ rendered to the sensing lever 52 by the tape tension is obtained by definite-integrating the equation 1 from $a_1$ to $a_2$ as follows:

$$W_1 = 2 \cdot F_2 \int_{a_2}^{a_1} a / \sqrt{a^2 + b^2/4}\, da$$

$$= 2 \cdot F_2 \left( \sqrt{a_1^2 + b^2/4} - \sqrt{a_2^2 + b^2/4} \right) \text{---- (2)}$$

FIG. 9 will be described below in fuller detail in contrast to the prior art.

In view of the disadvantage of the prior art, the present invention does not adopt the method to slide the engaging portion in the lock means. Instead, the lock means according to the present invention uses, as shown in FIG. 5, two arms 47 and 49 which are connected by the pivotally movable connecting means 51 to make the terminal of one arm 47 as the fixed supporting point 48 and the terminal of the other arm 49 as the other supporting point 50 slidable in one direction only.

Here, the straight line connecting between the supporting point 48 and the slidable supporting point 50 is defined as the reference line l of the arm. When a force is applied to the slidable supporting point 50 on the reference line l of the arm in the direction of the supporting point 48, if the connecting point 51 is not on the reference line l of the arm the slidable supporting point 50 slides in the direction of the supporting point 48, but if the connecting point 51 is on the reference line l of the arm the slidable supporting point 50 is held at the position even when a large force is applied thereto. In the present invention this state is used to maintain play mode. In order to switch it to stop mode a force is applied to the arm in the direction perpendicular to the reference line l. In the prior lock means wherein the engaging means is slidable, the friction force was a serious problem. However, in the present invention the friction force can be neglected for the reasons described below.

In case where a displacing force $F_3$ (see FIG. 6) by the springs 46 is exerted on the two arms 47 and 49 of FIG. 5, when a force is exerted in the direction perpendicular to the reference line l of the arms to displace the arms 47 and 49, the only reaction is the frictional forces at the supporting points 48, 50 and the connecting point 51. This frictional force is the largest when the two arms 47 and 49 are on the reference line l of the arm and diminishes as the inclination of the arms 47 and 49 increases. The frictional force when the inclination of the arms is small is now obtained from FIG. 5. When the inclination of the arms is small, the frictional force is substantially the same as that on the reference line of the arm. When a force $F_3$ is exerted on the supporting point 50 in the direction of the supporting point 48, a frictional force $\mu F_3$ ($\mu$: coefficient of friction) is produced at each contact portion of each of the supporting points and the connecting point. Since the frictional force at the contact portion of the arm 47 and the supporting point 48 concentrates on the surface (upper surface in the drawings) on which the arm 47 is exerted the force, the force $F_4$ exerted on the connecting point 51 to displace the arm 47 against the frictional force $\mu F_3$ at the supporting point 48 is expressed by the following equation according to balance of moments:

$$F_4 = \mu \cdot F_3 \cdot i/h_1$$

wherein:

$\mu$: coefficient of friction
$i$ : radius of the supporting point 48
$h_1$: length of the arm Likewise, the force $F_5$ exerted on the connecting point 51 to displace the arm 49 against the frictional force $\mu F_3$ on the contact surface of the supporting point 50 is expressed by the following equation:

$$F_5 = \mu \cdot F_3 \cdot i/h_2$$

wherein:

$i$ : radius of the connecting point 50
$h_2$: length of the arm 49

The force $F_6$ required for pivotally moving the arms 47 and 49 about the supporting points 48 and 50 against the frictional force at the connecting point 51 is equal to the sum of said forces $F_4$ and $F_5$, namely, $$F_6 = F_4 + F_5 = \mu \cdot F_3\ (i/h_1 + i/h_2)$$

Accordingly, the summed force $F_7$ exerted against the frictional force at the connecting point 51 is expressed by the following equation:

$$F_7 = F_4 + F_5 + f_6 = 2 \cdot \mu \cdot F_3 (i/h_1 + i/h_2) \quad (3)$$

And, when the lengths of the both arms 47 and 49 are respectively equal to h, the force $F_7$ exerted against the summed friction is:

$$F_7 = 4\ \mu \cdot F_3 \cdot i/h \quad (4)$$

Accordingly, when the radius of each shaft is equal to one-fourth of the length of the arm, the frictional force $F_7$ is equal to that of the lock means of the prior art in which the frictionally engaging portion by the slider and the stopper is made to slide. In the actual practice, however, the radius of each shaft is usually less than one-tenth of the length of the arm and, therefore, influence of friction is very small.

Figure 8:
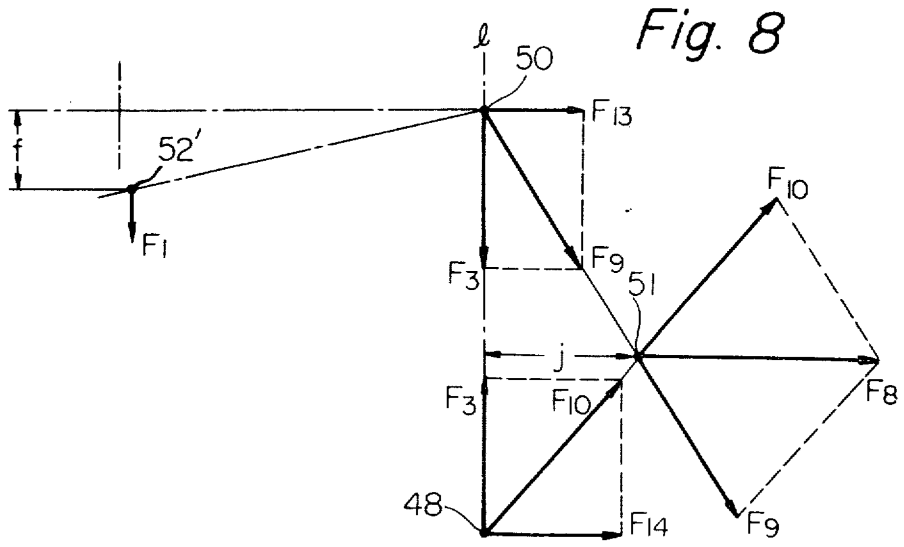
FIG. 8 illustrates transmission of forces in the lock means of FIG. 7 by vectors.

As shown in FIGS. 7 and 8, tension of the tape 21 increases at the terminal end thereof, and the tip 52' of the sensing lever 52 is, as previously described, displaced by the force $F_1$ by the distance $f$. It is assumed at this time that the connecting point 51 is displaced by the pivotal movement of the arm 49 by the distance $j$ from the reference line l in the direction perpendicular to the reference line l. FIG. 8 shows the vectors of the forces exerted on the supporting points 48, 50 and the connecting point 51 omitting the external forms of the arms 47 and 49. When the connecting point 51 is spaced from the reference line l of the arm by the distance $j$, the displaceing force $F_8$ at the connecting point 51 can be obtained by the following process. Namely, on the supporting point 50 there is exerted in the direction of the arm 49 a resultant force $F_9$ of the vertical drawing force $F_3$ by the spring 46 and a force $F_{13}$ restraining the supporting point 50 to be slidable only in the direction of the reference line l, and on the supporting point 48 there is exerted in the direction of the arm 47 a resultant force $F_{10}$ of the vertical drawing force $F_3$ by the spring 46 and a force $F_{14}$ fixing the supporting point 48. And, as a result, the displacing force $F_8$ exerted on the connecting point 51 is expressed in vector by the following equation:

$$\vec{F_8} = \vec{F_9} + \vec{F_{10}}$$

This force is expressed in scalar by the following equation:

$$|\vec{F_8}| = F_8 = F_3 j(1/\sqrt{h_1^2 - j^2} + 1/\sqrt{h_2^2 - j^2}) \qquad (8)$$

Particularly when the length of the arm 47 is $h$ equal to that of the arm 49, the displacing force $F_8'$ is expressed by the following equation:

$$F_8' = 2F_3 j/\sqrt{h^2 - j^2} \qquad (9)$$

Characteristics of the equation 8 are shown in FIG. 10. In the graph of FIG. 10, the axis of abscissa indicates the displacement $j$ of the connecting point 51, in which the displacement in the same direction as the vector $F_8$ in FIG. 8 is regarded as positive and the displacement in the opposite direction is regarded as negative. The axis of coordinate indicates the displacing force $F_8$, in which the positive side indicates that there is produced a force to displace by itself while the negative side indicates that the displacement will not occur unless a force is exerted.

In order to use the lock means having the two arms 47 and 49 shown in FIG. 5, it is necessary to provide the stopper 53 for controlling the displacement of the arm while locked and to make the arms 47 and 49 abut with the stopper 53 for ensuring the lock. To this end there is exerted an initial deflecting force $F_{11}$ (see FIG. 7) in the direction to make the arms 47 and 49 abut with the displacing stopper 53' by suitable means such as a spring (not shown). When the arm is displaced, since force $F_7$ (obtained by the equation 3 too is exerting, a force is applied at the connecting point to displace the arm with the force larger than the difference $F_{12}$ between the sum total of the reactions $(F_7 + F_{11})$ exerting on the arm and displacing force $F_8$ produced by displacement.

$$F_{12} = F_7 + F_{11} - F_8 \qquad (10)$$

Figure 12:
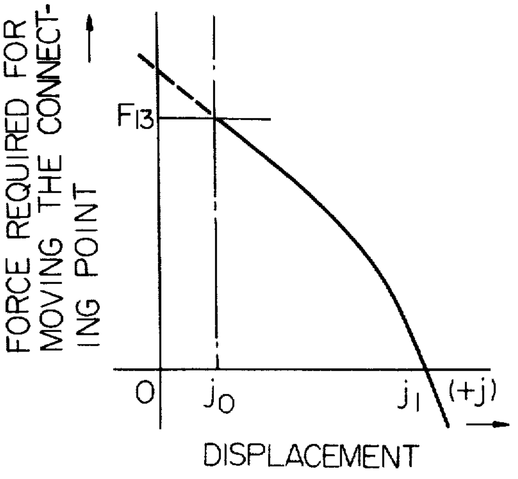

The present invention is efficient even under the conditions where the arms cannot be longer and when the shaft diameter cannot be smaller by various restrictions. In such conditions, since the frictional force $F_7$ becomes large and the force applied to release the lock is constant, the force $F_{11}$ of the spring shown in FIG. 7 must be reduced. However, if so doing, the proportion of the frictional force to the reaction exerting on the arm becomes great resulting that it has the same disadvantage as the lock means of the prior art in which the engaging portion is slidable. However, this is only when the lock position of the arm is set on the reference line l of the arm and this is not applied when displaced from the reference line. Namely, even when the frictional force is large the force of the spring is increased so as to counterbalance it, and, as shown in FIG. 12, the arm is displaced so that the holding force $F_{12}$ of the arm is not more than the force $F_{13}$ exerted to release the lock. At this point the stopper 53' is provided to be the lock position. By doing so, the influence of the frictional force on the whole can be decreased, and even when the reaction $(F_7 + F_{11})$ of the arm is large, the holding force $(F_7 + F_{11} - F_8)$ of the arm can be decreased by using the displacing force produced by the displacement of the arm. As described above, the term "lock position" is used in this specification to indicate the position of the arm in which the reaction $(F_7 + F_{11})$ of the arm is larger than the displacing force $F_8$ of the arm at the initial displacement $j_0$, the initial displacement $j_0$ is determined so that the holding force $(F_7 + F_{11} - F_8)$ is smaller than the force $F_{13}$ applied to release the arm, and the play mode can be maintained.

As already described, at the connecting point 51 between the arms 47 and 49, there is produced a frictional force which affects on the initial releasing force for releasing the holding force of the arm. In order to minimize such displacing frictional force at the initial stage, one arm is provided at the connecting point 51 with an elongated groove having a rounded end, a pin having a rounded section is fixed to the other arm so as to provide rolling contact by the engagement between the elongated groove and the round pin. It is widely known that rolling friction is considerably smaller than sliding friction.

The features of the automatic stop apparatus according to the present invention are that the operation of the tape recorder mechanism can be stopped even by a small force received by the sensing lever from the tape tension, the force obtained by the sensing lever can be effectively used to minimize mistakes in operation owing to shocks from outside, and since it has a wide allowance in the force required to release the lock, variation in the magnitude of the force by period of use or some other causes will not interfere with the releasing action. This is supported by FIG. 9. As easily seen from this Figure, in the lock means according to the present invention approximately 90 percent of the work of the sensing lever can be effectively used while in the known lock means only 50 percent of the work can be used.

The allowable error in the force required to release the lock in the known lock means having the sliding engaging portion ranges in FIG. 9 from the line C indicating the force normally exerted on the sensing lever during tape running to the line E indicating the unlocking force of the known lock means since the length of the portion in which the engaging portion slides is constant. In the lock means according to the present invention, since the characteristic line 59 becomes straight when the inclination of the arms is small in comparison to the length of the arms, the force received by the sensing lever when the tape tension is largest during the tape running can be used from the line C to the line D indicating the maximum force exerted on the sensing lever at the terminal end of the tape. And, as explained hereinbefore, since the scattering due to friction can be minimized, troubles of the automatic stop apparatus such as mis- or non-operation owing to secular change can be prevented.

Briefly, in the present invention, a force required to return to the stop position is stored at all times in the slidable sub-chassis mounted with the recording, reproducing and erasing heads and interlocked with the drive means of the tape recorder; the supporting point of an arm is provided in the sub-chassis; the supporting point of the other arm is provided in the chassis body of the tape recorder; the two arms are pivotally connected into lock means; said sub-chassis is moved forward to urge the head against the tape; and said sub-chassis can be maintained in this position. In order to provide said lock means with a lock holding force, a force is given to said means in the direction to make the arm abut with the stopper for controlling the lock position of the arm. In the automatic stop apparatus according to the present invention, when used with a "reel-to-reel type tape recorder, a terminal end of the tape is secured to the reel, two adjacent fixed points are provided on one side along the tape passage, a sensing lever is provided on the other side, the sensing lever is inserted between said two fixed points with the tape interposed therebetween, lock holding force of said arm is overcome by the pushing force of the sensing lever accompanied by the increase in the tape tension at the terminal end of the tape, the lock of said arm is released by the arm displacing force produced by the displacement of the arm while compensating for the pushing force of the sensing lever which reduces as the sensing lever is pushed out, the sub-chassis provided with the supporting point of the arm and held by the arm is moved back thereby stopping the drive means of the tape recorder interlocked therewith.

What we claim is:

1. A tape recorder and automatic stop means which comprises in combination a set of reels to which tape ends are secured and between which tape is driven, a sub-chassie having heads disposed to move toward tape passage and away from tape passage, the sub-chassie being spring biased away from tape passage, a first L-shaped arm having a first supporting point on the sub-chassie at the arm joinder and a sensing lever provided at an end thereof, a second arm having a second supporting point at a fixed position on a frame and pivotally connected to said first arm at an end opposite the sensing lever, means for locking the position of the sub-classis when said sub-chassis is moved so that said head is urged against the tape and the connecting point of said first and second arms comes on the straight line connecting said first and second supporting points, a set of spaced guide posts on the side opposite to said heads along the tape passage, said sensing lever of said first arm being pressure engaged with the tape portion stretching between said guide posts, said first and second arms being displaced by the sensing lever pushing force accompanied by increase of the tape tension at the terminal end of the tape, said sub-chassis being moved away from the tape passage and simultaneously therewith the mechanism interlocked with said sub-chassis being mechanically stopped.

2. An automatic stop apparatus for a tape recorder according to claim 1, wherein:

a stopper for determining the lock position of the arms is provided in the neighborhood of the connecting point of said first and second arms, an elastic member is provided for exerting a displacing force on one of said arms to bring the connecting point of the both arms into abutment with said stopper.

3. An automatic stop apparatus for a tape recorder according to claim 2, wherein:

a stopper for determining the lock position of the arms is attached slidably in the direction to unlock the arms, a stop button is interlocked with the stopper to manually unlock the arms.

4. An automatic stop apparatus for a tape recorder according to claim 2, wherein:

the initial position of said stopper is determined with a predetermined distance shifted from the straight line connecting said first and second supporting points in the direction of the displacement of the connecting point.

5. An automatic stop apparatus for a tape recorder according to claim 1, wherein:

said lock means is provided with a slider sliding in relation to the push button, said slider is engaged at an end with a movable contact of a normally open switch connected to a source of power for closing said switch when said lock means is operated and opening said switch when said lock means is released.

6. An automatic stop apparatus for a tape recorder according to claim 1, wherein:

said first and second arms are connected to each other at said connecting point by means of an elongated groove having a rounded end and a pin having a rounded section so as to provide said connecting point with rolling contact.

* * * * *